Nov. 11, 1952 E. W. DETJEN 2,617,191
CARRIAGE DRIVE MECHANISM FOR CURD FORKING MACHINES
Filed Sept. 13, 1950 6 Sheets-Sheet 1

INVENTOR
EDGAR W. DETJEN
BY
*Young and Wright*
ATTORNEYS

Nov. 11, 1952 E. W. DETJEN 2,617,191
CARRIAGE DRIVE MECHANISM FOR CURD FORKING MACHINES
Filed Sept. 13, 1950 6 Sheets-Sheet 4

INVENTOR
EDGAR W. DETJEN
BY
*Young Wright*
ATTORNEYS

Nov. 11, 1952 E. W. DETJEN 2,617,191
CARRIAGE DRIVE MECHANISM FOR CURD FORKING MACHINES
Filed Sept. 13, 1950 6 Sheets-Sheet 5

INVENTOR
EDGAR W. DETJEN

BY
*Young and Wright*
ATTORNEYS

Nov. 11, 1952 E. W. DETJEN 2,617,191
CARRIAGE DRIVE MECHANISM FOR CURD FORKING MACHINES
Filed Sept. 13, 1950 6 Sheets-Sheet 6
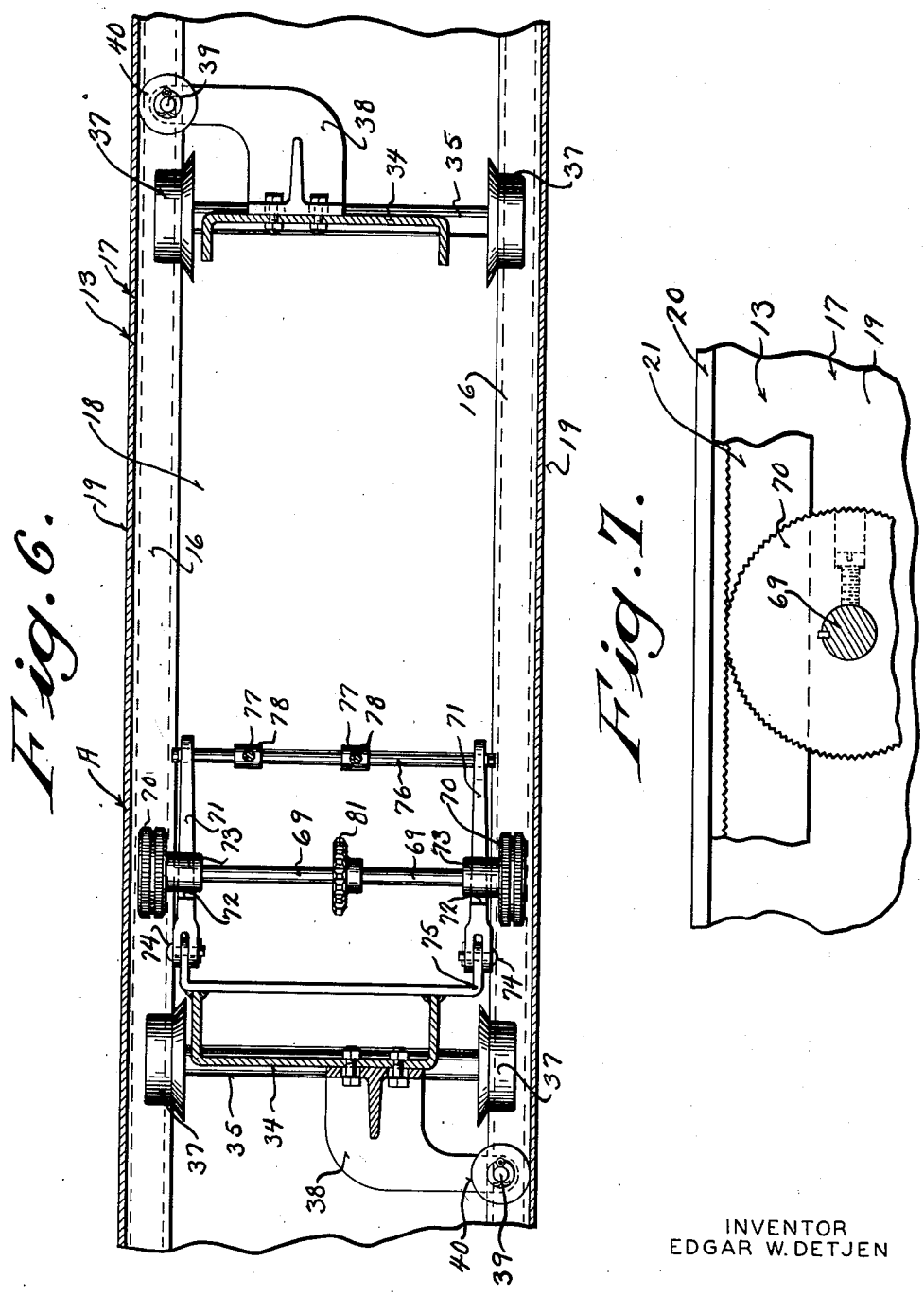
INVENTOR
EDGAR W. DETJEN
BY
ATTORNEYS Patented Nov. 11, 1952

2,617,191

UNITED STATES PATENT OFFICE 2,617,191

CARRIAGE DRIVE MECHANISM FOR CURD FORKING MACHINES

Edgar W. Detjen, Kiel, Wis., assignor to Stoelting Brothers Company, Kiel, Wis., a corporation Application September 13, 1950, Serial No. 184,680

9 Claims. (Cl. 31—48)

This invention appertains to cheese making equipment, and more particularly to a novel curd agitator or forker.

Heretofore, it has been customary to place a track over a vat and to mount a carriage on the track with a rotary agitator arranged between the rails of the track for movement along the track back and forth over the vat. Such apparatus, although efficient in forking the curd, is unsatisfactory for certain reasons and particularly in view of the fact that, in spite of best efforts, oil and other foreign matter drops from the carriage and track into the vat.

One of the primary objects of this invention, is to provide a completely housed carriage, with the agitator disposed laterally of the track, whereby the track can also be completely housed, so that the danger of oil and other debris falling from the track and carriage into the vat is eliminated.

Another salient object of my invention is to provide novel means for driving the carriage back and forth from a motor mounted on the carriage, the driving means including a floating spring urged shaft carrying roughened driving wheels engaging the track, the construction being such that proper and positive driving engagement is had between the carriage and track and whereby any irregularities in the track will not hinger the steady travel of the carriage.

A further important object of the invention is the provision of means for operating both the carriage and the agitator shaft from a common speed reducing mechanism actuated from the motor, whereby the speed of rotation of the agitator corresponds to the speed of travel of the carriage at all times, and whereby such speed will be at a common rate relative to one another.

A further important object of the invention is to provide means for regulating the distance of travel of the carriage along the vat and for automatically reversing the travel of the carriage when the carriage reaches a predetermined point.

A still further object of the invention is to provide a sanitary curd agitator or forker of the above character, which is durable and efficient in use, and one that can be placed upon the market and incorporated with a vat at a reasonable cost.

With these and other objects in view, the invention consists in the novel construction, arrangement and formation of parts, as will be hereinafter more specifically described and claimed, and illustrated in the accompanying drawings, in which drawings, Figure 1 is a side elevational view of the improved curd agitator or forker disposed above a vat, the vat being in longitudinal section and the section being taken on the line 1—1 of Figure 2, looking in the direction of the arrows.

Figure 6 is a horizontal sectional view taken on the line 6—6 of Figure 1, looking in the direction of the arrows, illustrating the support for the drive shaft and wheels of the carriage.

Figure 7 is a detail, longitudinal sectional view illustrating the engagement of one of the drive wheels with a rail of the track.

Referring to the drawings in detail, wherein similar reference characters designate corresponding parts throughout the several views, the letter A generally indicates the novel curd agitator or forker for use in connection with a vat V.

Figure 1:
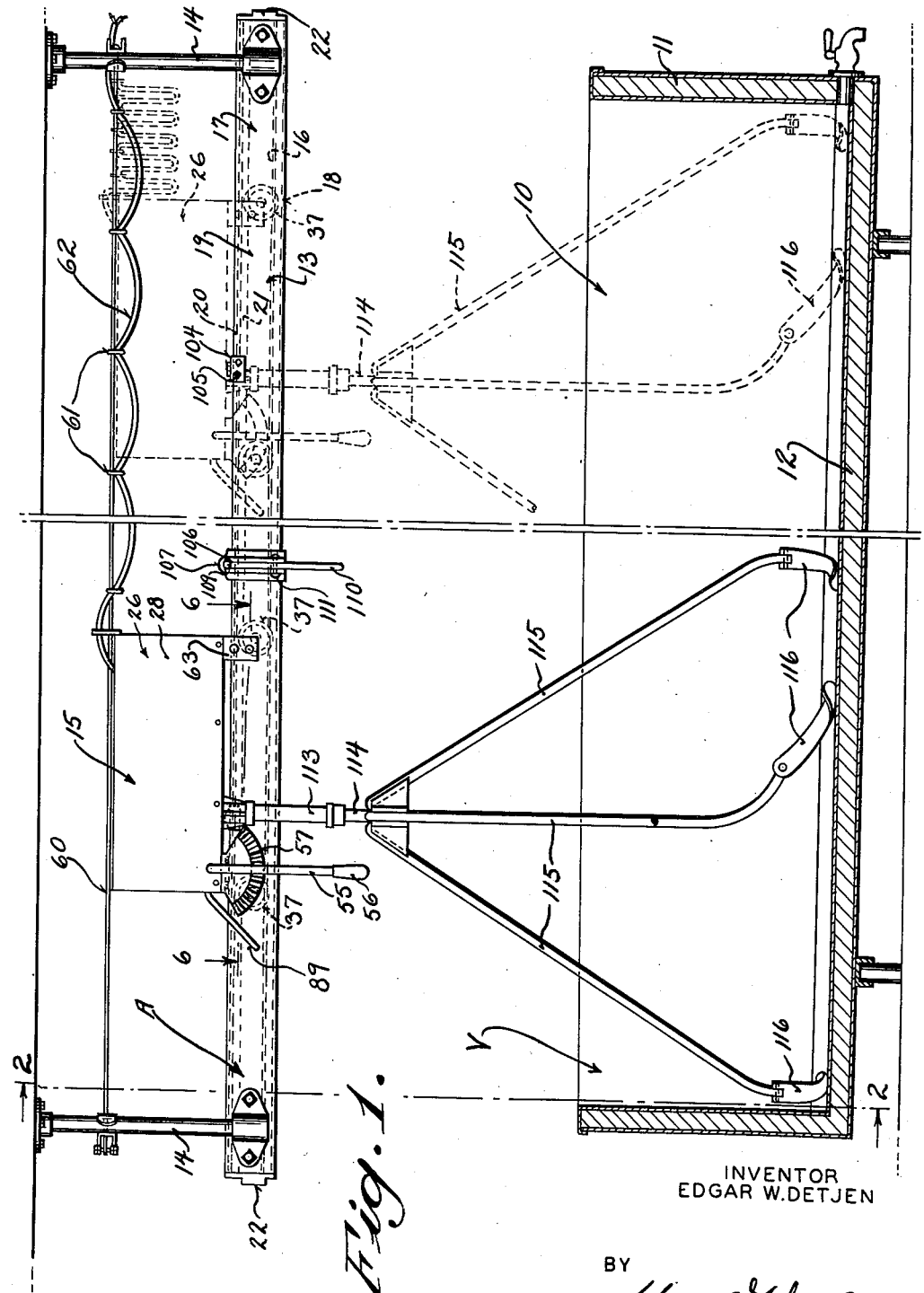

The vat V forms no direct part of the present invention and can be of any approved type now commonly used in cheese making, and can be of any preferred length and width. As illustrated, the vat V includes side walls 10, end walls 11, and a bottom inclined wall 12.

The agitator A comprises an overhead track 13, which extends longitudinally of the vat. The track 13 can be supported in any desired way, such as from the ceiling of a room, by depending brackets or standards 14. These brackets 14 are located at the ends of the track 13 so as not to interfere with the longitudinal travel of a carriage 15 mounted on said track.

The track 13 includes a pair of longitudinally extending spaced parallel rails 16, which can be of an inverted U-shape in cross section. These rails 16, are rigidly secured in a longitudinally extending casing 17 which embodies a bottom wall 18, upright spaced parallel side walls 19 and top inturned flanges 20. This casing 17 is braced by top longitudinally extending spaced parallel angle irons or the like 21, which also form tracks for facilitating the driving of the carriage 15, as will later appear. It is to be noted that the lower rails 16 and the upper rails 20 are disposed at the upper and lower corners of the casing 17, and form means for bracing the casing throughout its entire length. These rails can be welded or otherwise secured to the casing. If desired, the ends of the casing can also be closed by suitable end walls 22.

Figure 2:
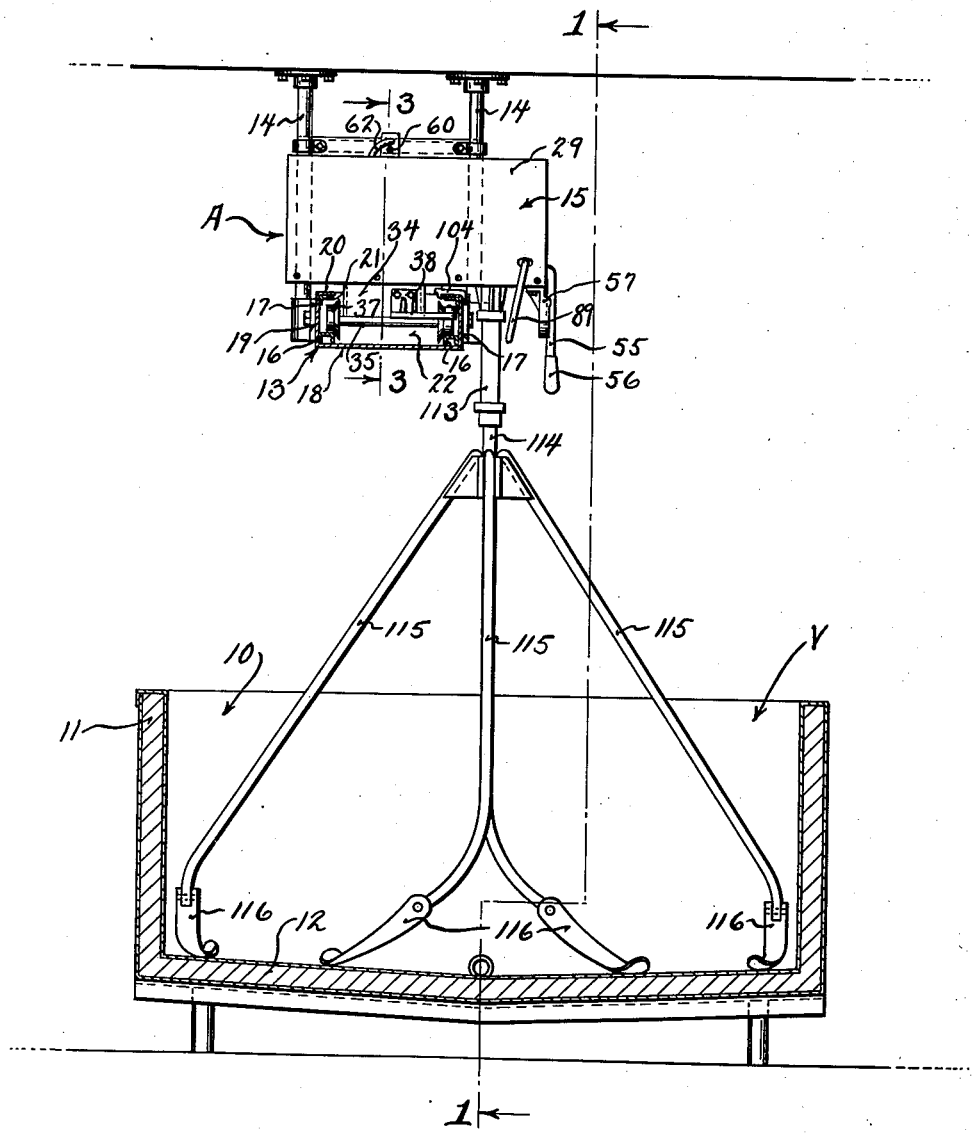
Figure 2 is a transverse sectional view taken on the line 2—2 of Figure 1, looking in the direction of the arrows, the carriage being shown in end elevation.

The carriage 15 includes a bottom open frame 23 preferably, but not necessarily, constructed from angle iron and as shown, this frame 23 includes longitudinally extending side rails 24 and connecting end rails 25. Welded or otherwise fastened to this frame is a housing 26 formed from sheet metal or the like, of the desired gauge. The housing 26 includes a flat bottom wall 27, side walls 28 and end walls 29. The various operating parts are completely contained within this housing, as will be later set forth and the housing and the frame 23 can be braced in any suitable manner. As illustrated, an intermediate, longitudinally extending brace bar 30 is welded or otherwise secured to the end rails 25 of the frame. A flat horizontal brace plate 31 is also provided and this plate partially extends transversely across the bottom of the housing and the ends thereof can be welded or otherwise secured to one side rail 24 of the frame 23, and to the longitudinally extending brace bar 30. Arranged in spaced parallel relation to the longitudinally extending brace bar 30 is an intermediate angle iron brace bar 32, which is secured to the end rails 25 of the frame and this brace 32 can be connected by a brace bar 33 to the adjacent side rail 24. This forms a rugged construction and it is to be noted by referring to Figures 3 and 5 that parts of the bottom wall 27 directly above the rails 13 can be omitted for permitting portions of the driving mechanism to extend down below the carriage to the track. Longitudinally secured to the opposite ends of the carriage 15 are depending transversely extending bolsters 34 and these bolsters carry suitable bearings 35 for rotatably receiving axles 36. The ends of the axles in turn carry flanged carriage wheels 37 which engage the lower rails 16. Hence, the carriage 15 is mounted for free movement on the tracks and particular attention is called to the fact that the carriage extends laterally on one side of the track 13. This is best shown in Figures 2, 4 and 5. At this point, it can be seen that the tracks 13 are arranged at one side of the longitudinal center of the vat V and that the laterally projecting portion of the carriage 15 extends over the longitudinal center of the vat. The bolsters 34 adjacent to their opposite corners carry outwardly projecting brackets 38 and these brackets carry upright pins 39 on which are mounted guide rollers 40. The guide rollers 40 engage the inner faces of the side walls 19 of the casing 17, and effectively prevent lateral shifting or turning of the carriage on the tracks and these rollers aid in the efficient traveling of the carriage along the tracks.

Arranged within the housing 26 of the carriage 15 is an electric motor 41 of the desired horsepower, and the base of the motor carries spaced, parallel bearing sleeves 42, slidably mounted on parallel guide rods 43. The guide rods 43 are welded or otherwise secured rigidly to one end rail 25 of the housing and to the brace plate 31. Hence the motor slides back and forth longitudinally of the housing and the carriage. The guide sleeves 42 can be adjustably carried by the base of the motor 41 to facilitate the mounting of the motor on the guide rods and if desired, one of the guide rods 43 can be provided with a stop 44 for limiting the sliding movement of the motor 41 in one direction. The motor is disposed directly over the casing 17 of the tracks 13.

Also mounted within the housing of the carriage is a gear box 45 and this gear box is arranged on the opposite side of the longitudinal center of the carriage from the motor 41 and on the opposite side of the transverse center of the carriage from the motor 41. This gear box is arranged in the portion of the carriage which projects laterally from the tracks 13 and the gear box can be rigidly secured in place in the carriage by means of studs 46 or the like fastened to one side rail 24 and the intermediate brace angle bar 32. The gear box also includes a reverse mechanism and the gear box and the reverse mechanism is of a standard type, which can be purchased in the open market, and hence the same will not be described in detail, but it is to be noted that the same includes a power inlet shaft 47 arranged in parallel relation to the armature shaft 48 of the motor. The armature shaft of the motor has connected therewith a variable speed pulley 49, which is also of a type now found in the open market. The shaft 47 of the gear box has keyed thereto a pulley 50, and the pulley 50 and the variable speed pulley 49 are connected by a V-shaped pulley belt 51. By shifting the motor 41 toward and away from the gear box, the pulley 50 can be driven at different and desired speeds.

The motor 41 can be shifted back and forth in any desired way, but as illustrated (see Figures 3, 4 and 5), the carriage carries a transversely extending rock shaft 52, disposed adjacent to one end thereof. This shaft is mounted in suitable bearings 53 carried by the frame of the carriage and the inner end of the shaft has formed thereon or secured thereto a crank arm 54. The outer end of the shaft extends through one side wall 28 of the carriage housing and terminates in a depending operating lever 55. This lever is provided with a hand grip 56 and the lever travels over a quadrant 57, which is rigidly secured to the carriage frame. An expansion spring 58 is coiled about the rock shaft 52 and is confined between the brace plate 30 and the crank 54 and functions to normally urge the lever 55 in engagement with the teeth of the quadrant 57. Hence the lever 55 and consequently, the rock shaft 52 can be held in a selected position after movement thereof by the operator. A connecting link 59 operatively connects the crank 54 with the base of the motor 41 and hence upon rocking of the shaft the motor can be shifted toward and away from the pulley 50 to increase or decrease the active diameter of the variable speed pulley 49, for increasing or decreasing the speed of the pulley 50.

The current for the electric motor 41 can be derived from any suitable source of electrical energy and as illustrated, a guide wire 60 can be supported between certain of the hangers or standards 14, and this guide wire slidably receives a series of clips 61 for supporting the cable 62, which leads from the source of electrical energy to the motor 41. A control switch 63 can be provided for bringing about the starting and stopping of the motor.

Leading from the gear box 45, is the main drive shaft 64 for the carriage. This shaft 64 leads from a reverse mechanism (not shown), in the gear box, and as heretofore intimated, the reversing mechanism is of a character now commonly employed in various appliances. The reverse mechanism includes an operating crank 65, which extends laterally out of the gear box and the means for controlling the travel of the carriage back and forth will be later set forth. The carriage is driven from this reverse mechanism in the following manner. Rotatably mounted upon the drive shaft 64 is a sprocket wheel 66 and rigidly connected to the sprocket wheel is the forwardly extending arm 67 disposed in the path of travel of a radially extending lug 68 secured to the drive shaft 64. Upon rotation of the drive shaft 64 in one direction, the lug 68 will engage one side of the arm 67, and when the shaft is driven in the opposite direction the lug 68 will move away from the arm and then engage the other side of the arm and drive the sprocket 66 in a reverse direction. This gives a time lag in the reverse driving of the sprocket 66 so as to eliminate undue strain or a jerk on the carriage when the carriage reverses its direction of travel, and gives the agitator carriage a time to remain stationary, so that the forker shaft can make a complete revolution. Hence, the forker blades can clean out the corners of the cheese vat to remove all curds. The drive mechanism for the carriage includes a live drive axle 69 which extends transversely of the carriage and this shaft has secured to the opposite ends thereof knurled or serrated drive wheels 70, which engage the tracks 21. The drive wheels 70 are formed from hardened metal, for a purpose which will also later appear. A pair of rock arms 71 is provided for supporting the shaft or axle 69 and these arms are notched as at 72 for receiving the bearings 73 for the shaft or axle 69. Consequently, the shaft or axle has limited movement on the rock arms 71. The rock arms 71 are carried by pivot pins 74 which are in turn supported by bracket ears 75 secured to one bolster 34. The opposite ends of the rock arms 71 are connected by a cross rod 76. Hanger rods 77 are provided for supporting the rock arms 71 and these hanger rods 77 are provided with sleeves 78 which loosely receive the cross rod 76. The hanger rods 77 loosely extend through the brace plate 31. Expansion coil springs 79 are placed on the upper ends of the hanger rods 77 and engage the upper surface of the brace plate 31. Winged nuts 80 are threaded on the upper ends of the rods and bear against the upper ends of the springs 79. The tension of the springs can be regulated by adjusting the nuts. The hanger rods 77 and the springs 79 function to normally urge the rocker arms in an upward direction and consequently the hardened, knurled drive wheels 70 are resiliently and firmly held against the tracks 21. In actual practice, the hardened, knurled wheels 70 will cut into the rails or tracks 21, as best shown in Figure 7, and this will give a positive driving connection between the drive wheels 70 and the rails or tracks 21. The drive axle 69 has keyed or otherwise fastened thereto a drive sprocket 81 and a sprocket chain 82 is trained about the sprockets 66 and 81 for driving the axle. A chain tightener can be provided and the same can include an idle sprocket 83 carried by a hanger 84 supported on the longitudinally extending brace bar 30. The hanger 84 can be held in any selected position on the brace bar 30 by set screws 85.

The means for operating the crank 65 for the reverse mechanism in the box 45 embodies a swinging lever 86 mounted for up and down swinging movement on a pivot stud 87 carried by one end of the gear box 45. It is to be noted that this operating lever 86 also carries a depending bracket 88 at its outer end to which can be secured a hand crank 89. This hand crank 89 extends out of the carriage housing 26, adjacent to the hand lever 55 employed as heretofore described, for regulating the speed of travel of the carriage. Hence, the crank 89 is conveniently positioned for manually operating the lever 86, which is directly coupled to the reversing crank 65. The means for connecting the lever 86 to the crank 65 consists of spaced ears 90 formed on the lever 86 and these ears receive the reverse crank 65 therebetween. The ears adjustably carry bearing studs 91 for engaging the opposite sides of the reverse crank and this provides means for obtaining an adjustment between the lever 86 and said reversing crank.

Means is also provided for automatically actuating the lever 86 so as to automatically bring about the reverse traveling movement of the carriage 15 when the carriage reaches a desired limit of its travel in one direction. This means includes a bell crank 92, that is mounted at its angle on a stud or like bolt 93 secured to the inner wall of the gear box 45. The lower arm of this bell crank 92 extends below the carriage housing 26 and terminates in an operating head 94 for a purpose, which will be later described.

The outer end of the upper arm of the bell crank 92 carries a laterally extending ball 95 and connected to the ball head for universal movement is a connecting link 96 which is in turn coupled to the ball end 97 of a throw arm 98. The throw arm 98 is rockably mounted on a stud 99 carried by one end wall of the gear box 45. The throw arm 98 extends through an opening 100 in the triangular shaped bearing lug 101 formed on the inner end of the lever 86. An expansion spring 102 is coiled about the throw arm 98 and the inner end of this spring can bear against the stud 99 and the outer end of the spring bears against a tilted washer 103 carried by said throw arm and which engages one side or the other of the triangular shaped bearing head 101 according to the position of the lever 86.

In operation of the automatic reverse mechanism, when the bell crank 92 is swung in one direction from a full line position (see Figure 3) to move its upper arm downward to a dotted line position (also see Figure 5) the throw arm will be pulled down and this throw arm will in turn pull down on the lever 86 which will operate the reverse crank 65. As the lever 86 reaches its full lowered position, the washer 103 will rock on the point of the triangular shaped head 101 and will snap over to the upper face thereof and hold the lever 86 in its lowered position against accidental displacement. When the bell crank 92 is operated in the reverse direction, then the throw arm 98 will be raised and will pull up the lever 86 therewith, and when the lever and the throw arm reach their extreme raised position, the washer 103 will rock on the point of the triangular shaped head 101 and the washer will engage the lower inclined face of said head 101 and the spring 102 will hold the lever 86 in its raised position. The movement of the reverse crank 65 from a raised to a lowered position and vice versa, will reverse the direction of rotation of the shaft 64 and thus control the direction of travel of the carriage 15.

Figure 3:
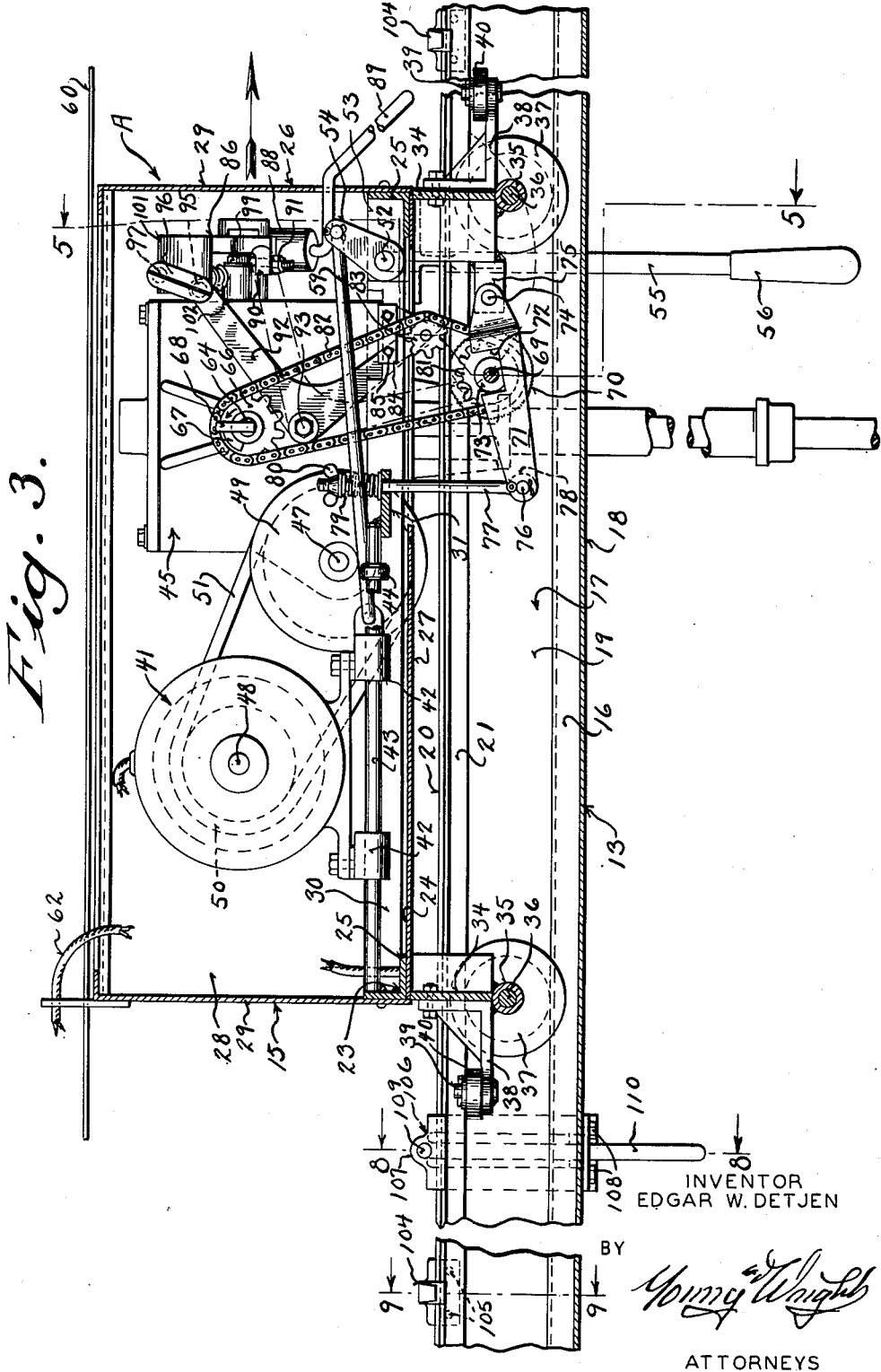
Figure 3 is a fragmentary longitudinal sectional view through the curd agitator taken on the line 3—3 of Figure 2, looking in the direction of the arrows, the view being on a larger scale than Figures 1 and 2 and illustrating in particular the novel drive for the carriage and the stops for reversing the travel of the carriage.
Figure 4:
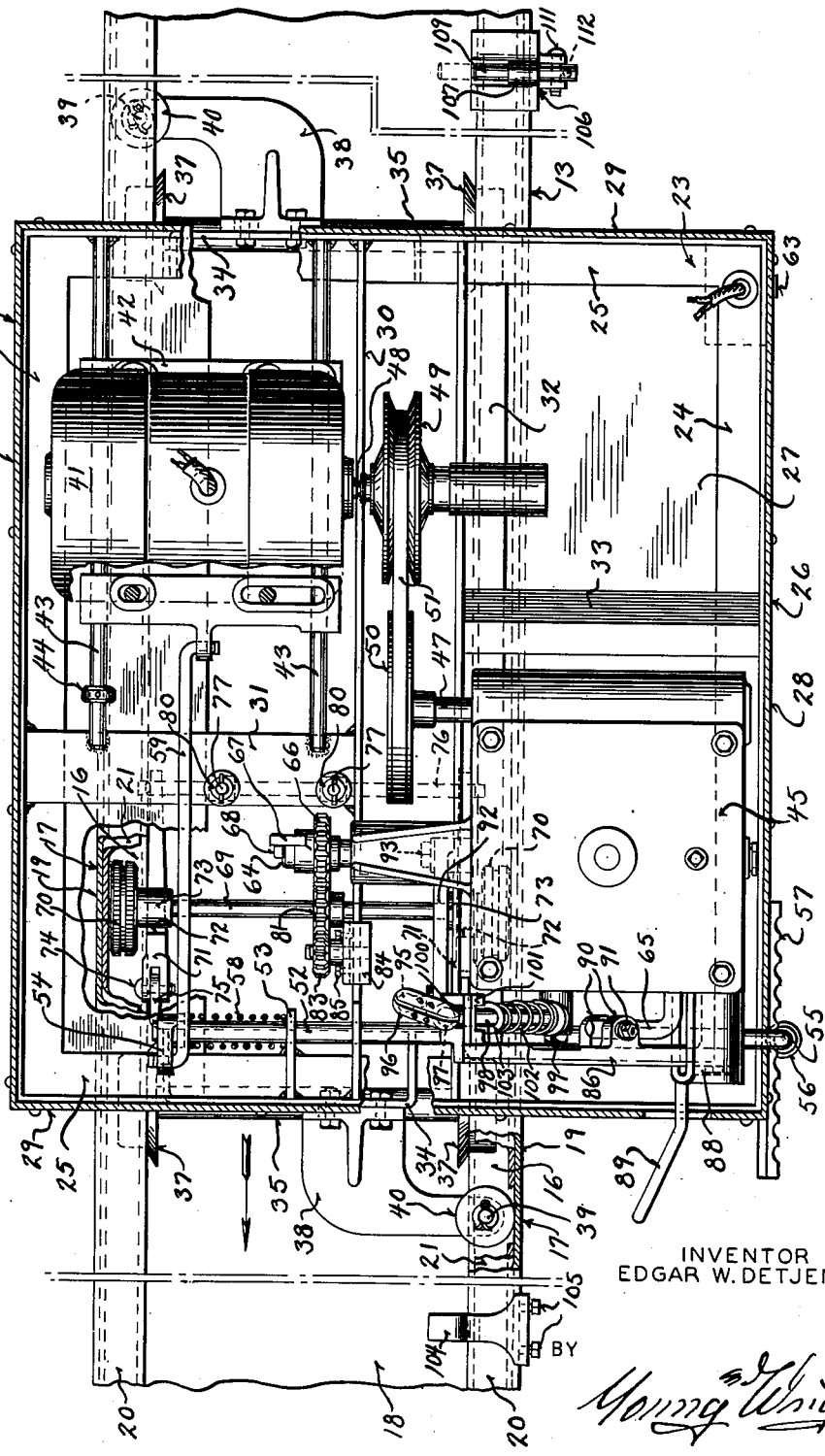
Figure 4 is a horizontal sectional view taken on the line 4—4 of Figure 5, looking in the direction of the arrows.
Figures 5, 8, 9:
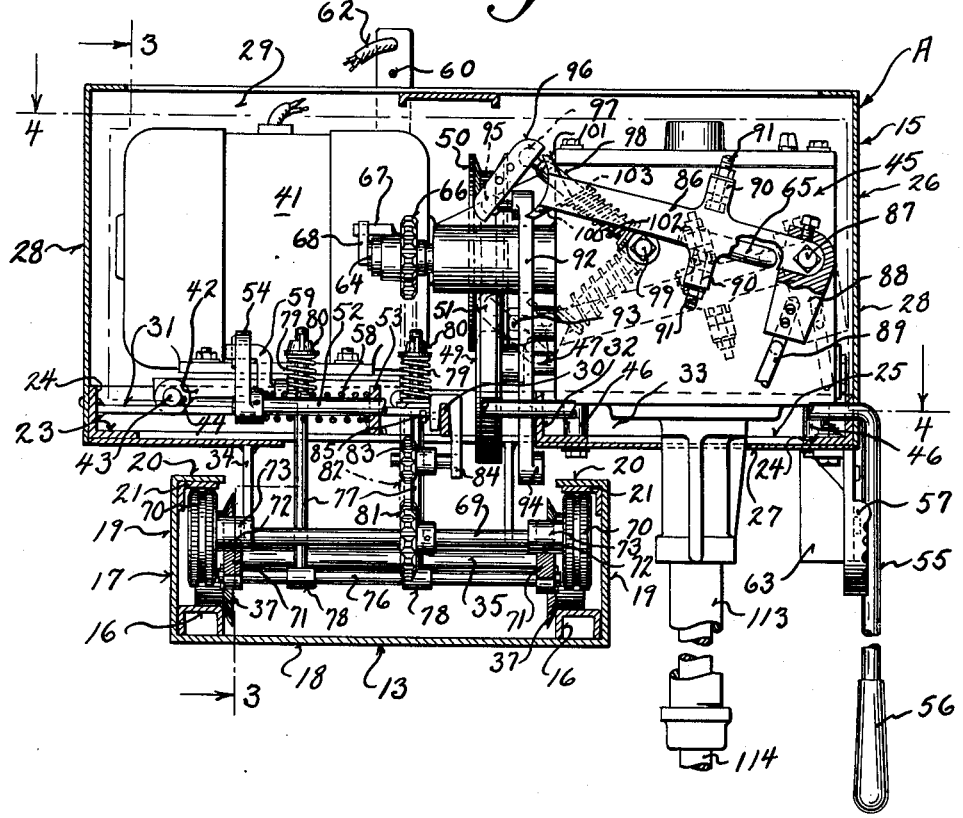
Figure 5 is a transverse sectional view taken on the line 5—5 of Figure 3, looking in the direction of the arrows.
Figure 8 is a detail transverse sectional view through one rail of the track illustrating an intermediate and adjustable stop for reversing the carriage.
Figure 9 is a detail section, similar to Figure 8 but illustrating one of the end stops for reversing the carriage.

To operate the bell crank 92, end stops 104 are arranged in the path of the operating knob or head 94 of the bell crank, and these end stops are carried by one side of the track structure 13 (see Figures 3, 4 and 9). The stops 104 are constructed identically alike and extend inwardly over the flanges 20 of the track housing 17 and are held in a preferred adjusted position by set screws 105. These stops 104 are secured in position on the track structure 13 at the desired limits of travel of the carriage on the track structure, and hence when the carriage reaches one end of the track structure, the bell crank will engage one of the stops 104 and the position of the bell crank will be reversed for operating the crank 65, and as stated, a time lag is provided to permit the slowing up of the travel of the carriage before the reversal of the traveling movement thereof. This also gives the carriage a time to remain stationary so that the forker shaft can make a revolution to permit the blades to clean out the corners of the vat.

In some instances where a large vat is employed, two carriages can be employed in lieu of the single carriage shown and illustrated. In other instances, where only a small quantity of the curds occupy only a portion of the vat, the distance of travel back and forth of the carriage can be shortened. Hence, I provide (see Figures 3, 4 and 8) an intermediate stop 106 and this stop can be manually actuated to bring the same into an operative or inoperative position. The intermediate stop 106 includes a bracket 107 which can be firmly clamped around one side of the track housing 17 by means of set screws 108 in a selected desired position. Slidably carried by the bracket 107 is a trip rod 109 and this trip rod can be moved into and out of the path of the operating knob or head 94 of the bell crank 92, by means of a hand lever 110. The hand lever 110 is rockably mounted intermediate its ends on a pivot pin 111, carried by the bracket 107. The upper end of the lever 110 is operatively connected, as at 112 to the trip rod 109. The lower end of the lever can be extended downward to form a convenient operating handle.

Extending downward from the gear box 45 through a gear box supported bearing 113, is the agitator shaft 114. This shaft is operated through certain gears in the gear box and by referring particularly to Figures 4 and 5, it can be seen that the shaft 114 and the bearing 113 are disposed at one side of the track structure 13, and this is provided for by the extension of the carriage 15 laterally of the track structure, as heretofore described. The agitator shaft 114 is disposed approximately at the longitudinal center of the vat V, and this shaft has secured thereto the outwardly and downwardly angled agitator arms 115 and the lower ends of the arms have secured thereto, the desired type of agitator or forker paddles or blades 116.

Obviously, during the travel of the carriage 15, the agitator shaft 114 will be rotated at a speed commensurate with the speed of travel of the carriage and consequently thorough agitation or forking of the curds will take place.

Great stress is laid on the fact that the forker or agitator shaft 114 is disposed laterally of the track structure 13, so that said track structure can be entirely housed. The carriage itself is completely enclosed and the bearing 113 for the agitator shaft 114 extends through an opening in the bottom wall of the carriage housing and this opening can be so made that the walls thereof will closely engage the bearing. Thus a complete sanitary agitator is provided and the structure is such that an efficient and durable agitator will be had.

Various changes in details of structure can be made without departing from the spirit or the scope of the invention, but what is claimed as new is:

1. A curd agitator and forker for a curd receiving vat comprising an overhead track structure disposed above the curd receiving vat and arranged at one side of the longitudinal axis of the vat including a pair of spaced parallel rails, said track structure including spaced parallel rails, a carriage for movement back and forth on said track structure including wheels engaging the tracks, said carriage projecting laterally beyond one side of the track structure, an agitator shaft depending from the laterally projecting portion of the carriage disposed substantially at the longitudinal center of the vat, and a casing carried by said rails including a bottom wall and side walls.

2. A curd forker and agitator as set forth in claim 1, and a housing for at least that portion of the carriage which projects laterally beyond the track structure having an opening for the forker shaft.

3. A curd agitator or forker comprising an overhead track structure including spaced parallel lower rails and spaced parallel upper rails, a carriage mounted upon the track structure for movement back and forth thereon including front and rear axles, wheels on said axles engaging the lower rails, a drive axle on the carriage, knurled wheels on the drive axle engaging the lower surface of the upper pair of tracks, an electric motor on said carriage, a depending agitator shaft on the carriage, means for operating the drive axle and the agitator shaft from the motor including a reverse gear box, means for operating the reverse gear mechanism of said box including a reverse crank, a bell crank rockably mounted at an angle on the carriage, including a depending arm projecting down toward the track structure, stops on the track structure arranged in the path of the depending arm of the bell crank for swinging said bell crank as the bell crank moves past a stop, and means operatively connecting the other arm of the bell crank to the reverse crank for actuating the reverse crank upon movement of the bell crank by a stop.

4. A curd agitator or forker as set forth in claim 3 and means for holding said operating means against accidental movement in its two different positions.

5. A curd agitator or forker as set forth in claim 3, and an intermediate stop carried by the track structure including a trip rod, and manual means for moving the trip rod into and out of operative position relative to the lower end of the bell crank.

6. A curd forker or agitator comprising an overhead track structure including a pair of spaced parallel lower rails and a pair of spaced parallel upper rails, a casing for said track structure including a bottom wall, side walls and inturned flanges on the side walls, said casing enclosing said tracks, a carriage mounted upon the track structure for movement back and forth thereon including a frame, a housing on the frame, and bolsters on the frame, axles rotatably carried by the bolsters, wheels on the axles engaging the lower tracks, laterally projecting brackets at the opposite diagonal corners of the carriage, horizontally disposed guide rollers engaging the side walls of the casing, a pair of rock arms mounted upon the carriage having notches in their upper ends, a drive axle having bearings received in said notches, knurled drive wheels on said drive axle engaging the upper pair of tracks, a brace plate for the frame, a cross rod connecting said rock arms, hanger rods extending through the brace plate and receiving the cross rod, adjusting nuts on the upper ends of the hanger rods, expansion springs on the hanger rods disposed between the nuts and the brace plate, a drive motor, and means for driving the axle at different speeds from the motor.

7. A curd agitator or forker comprising an overhead track including spaced longitudinally extending parallel rails arranged at one side of the longitudinal axis center of a curd receiving vat, a carriage mounted upon said track for movement along the track and back, said carriage projecting laterally from one side of the track toward the longitudinal axis of the vat, a rotary agitator shaft depending from the laterally extending portion of the carriage and disposed substantially at the longitudinal axis of the vat, and a casing for said track bridging the rails and completely enclosing the bottom of the track.

8. A curd agitator or forker comprising an overhead track arranged at one side of the longitudinal center of a curd receiving vat, a carriage mounted upon said track for movement along the track and vat, said carriage projecting laterally from one side of the track toward the longitudinal axis of the vat, a rotary agitator shaft depending from the laterally extending portion of the carriage and disposed substantially at the longitudinal center of the vat, a casing enclosing the lower portion of the track, and a housing for said carriage through which the shaft extends.

9. A curd agitator or forker comprising an overhead track structure including a pair of spaced lower parallel rails and a pair of upper spaced parallel rails, a carriage mounted on said track structure for movement back and forth thereon including axles adjacent to the opposite ends thereof, wheels on said axles engaging the lower rails, a drive axle, means for driving the axle, and knurled drive wheels on the axle engaging the lower surface of the upper rails, and rock arms loosely supporting the drive axle, and spring means normally urging the rock arms to a raised position with the knurled drive wheels in firm contact with the upper pair of rails.

EDGAR W. DETJEN.

REFERENCES CITED

The following references are of record in the file of this patent:

UNITED STATES PATENTS

| Number | Name | Date |
|---|---|---|
| 2,139,338 | Stoelting | Dec. 6, 1938 |
| 2,360,869 | Gilbert et al. | Oct. 24, 1944 |